April 18, 1939.　　J. B. BARTOW　　2,155,295
AIRPORT LIGHTING SYSTEM
Filed March 21, 1935　　6 Sheets-Sheet 1
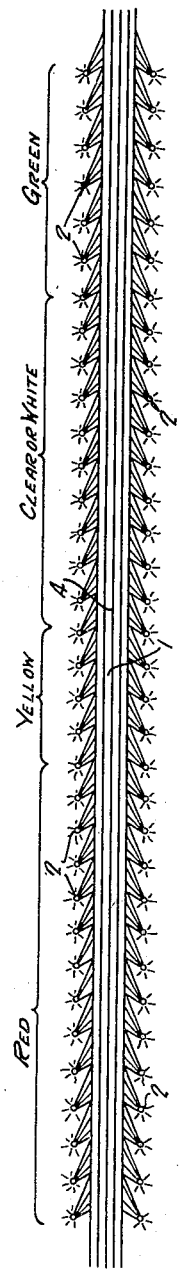
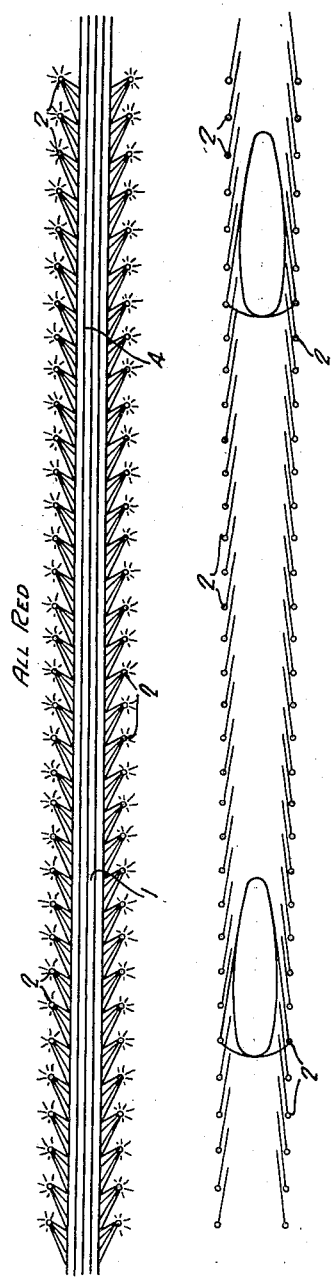
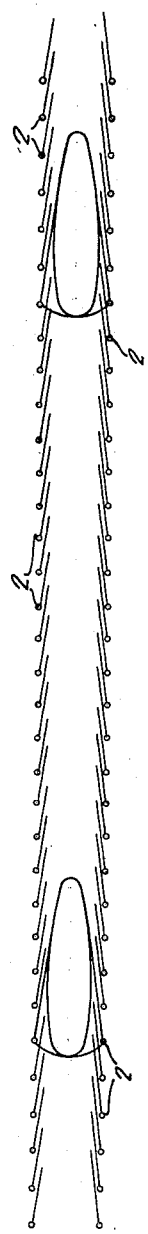
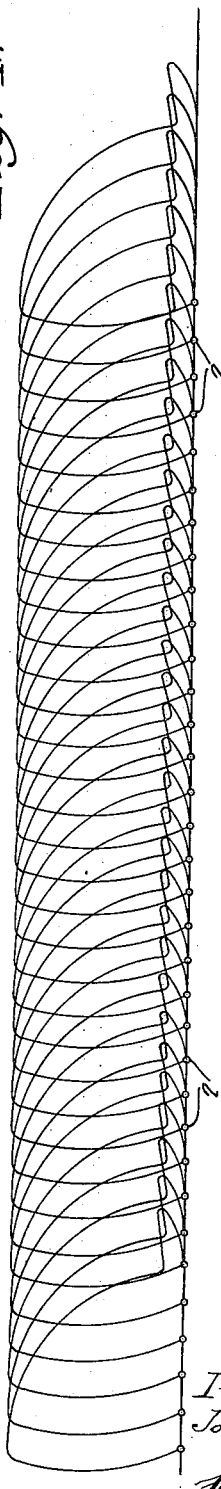
Inventor
John B. Bartow
by his Attorneys

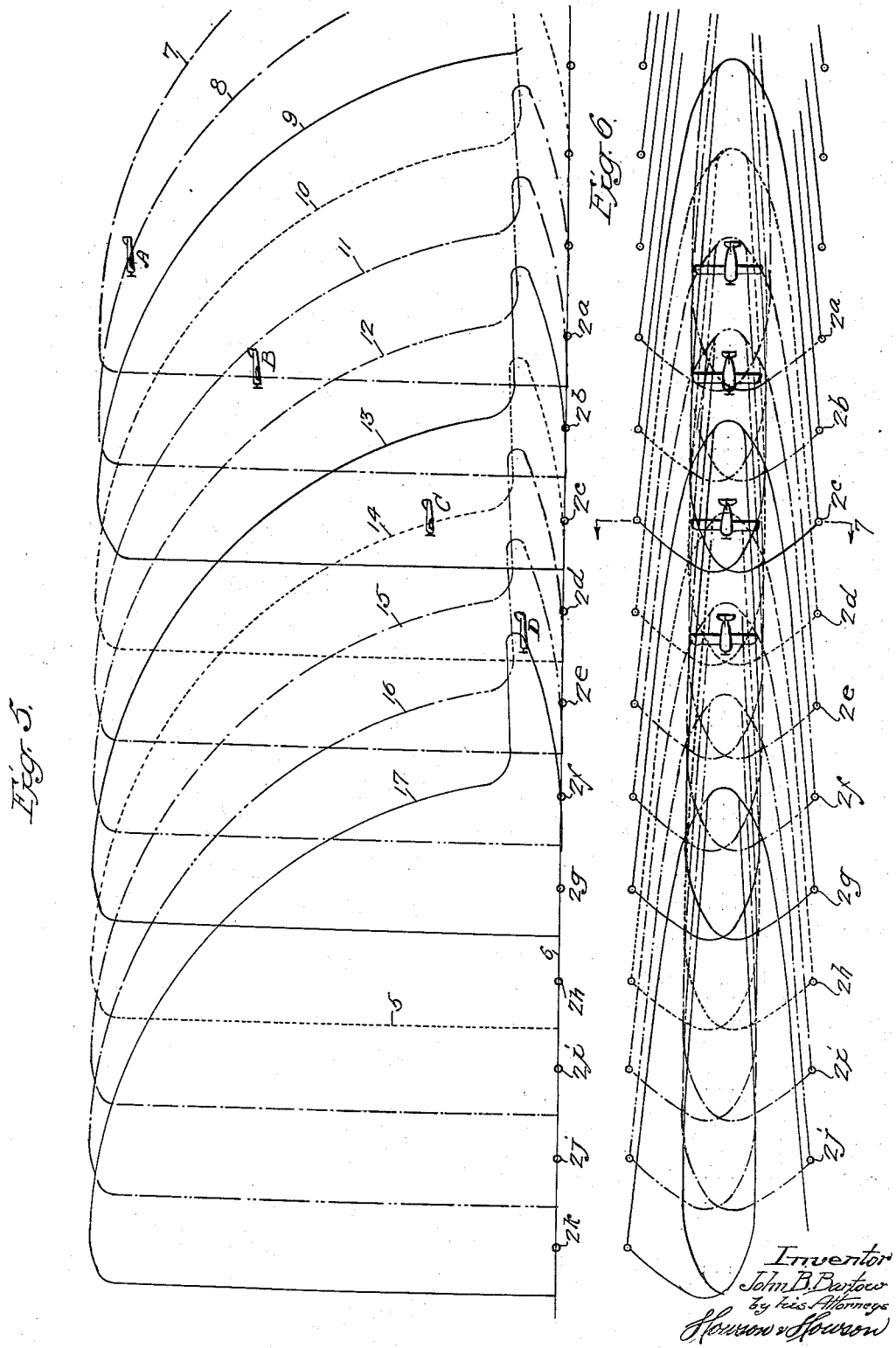

April 18, 1939.   J. B. BARTOW   2,155,295
AIRPORT LIGHTING SYSTEM
Filed March 21, 1935   6 Sheets-Sheet 3
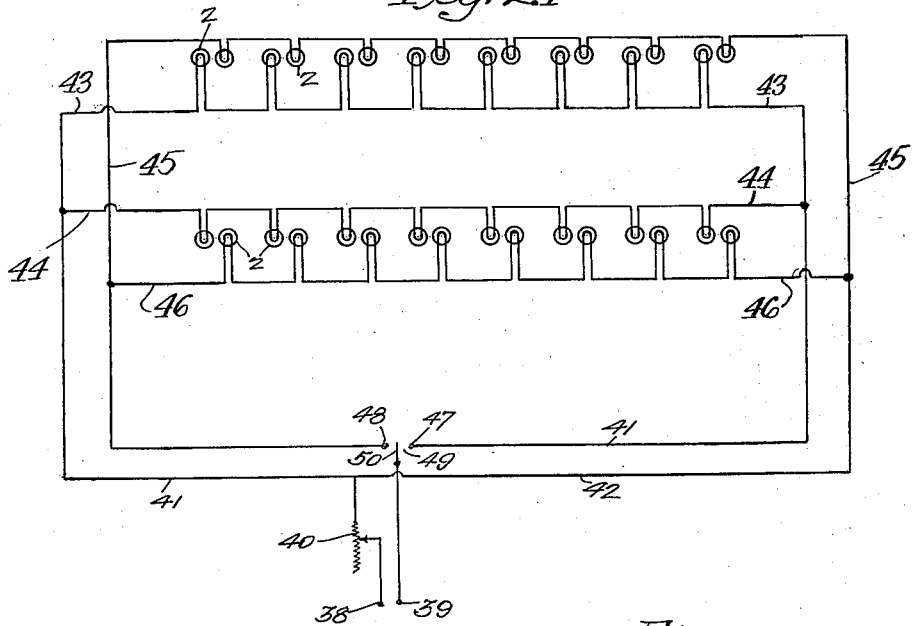
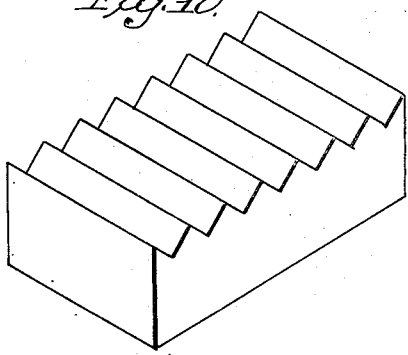
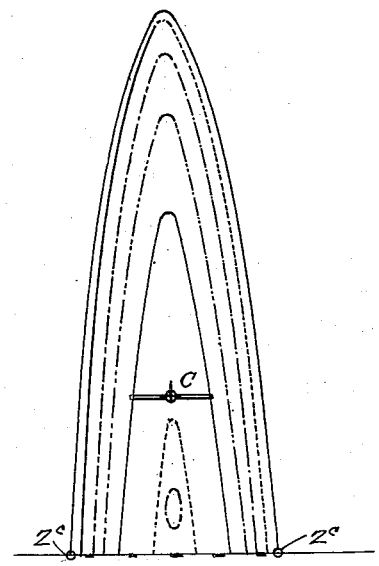
Inventor
John B. Bartow
by his Attorneys
Howson & Howson April 18, 1939.    J. B. BARTOW    2,155,295
AIRPORT LIGHTING SYSTEM
Filed March 21, 1935    6 Sheets-Sheet 4
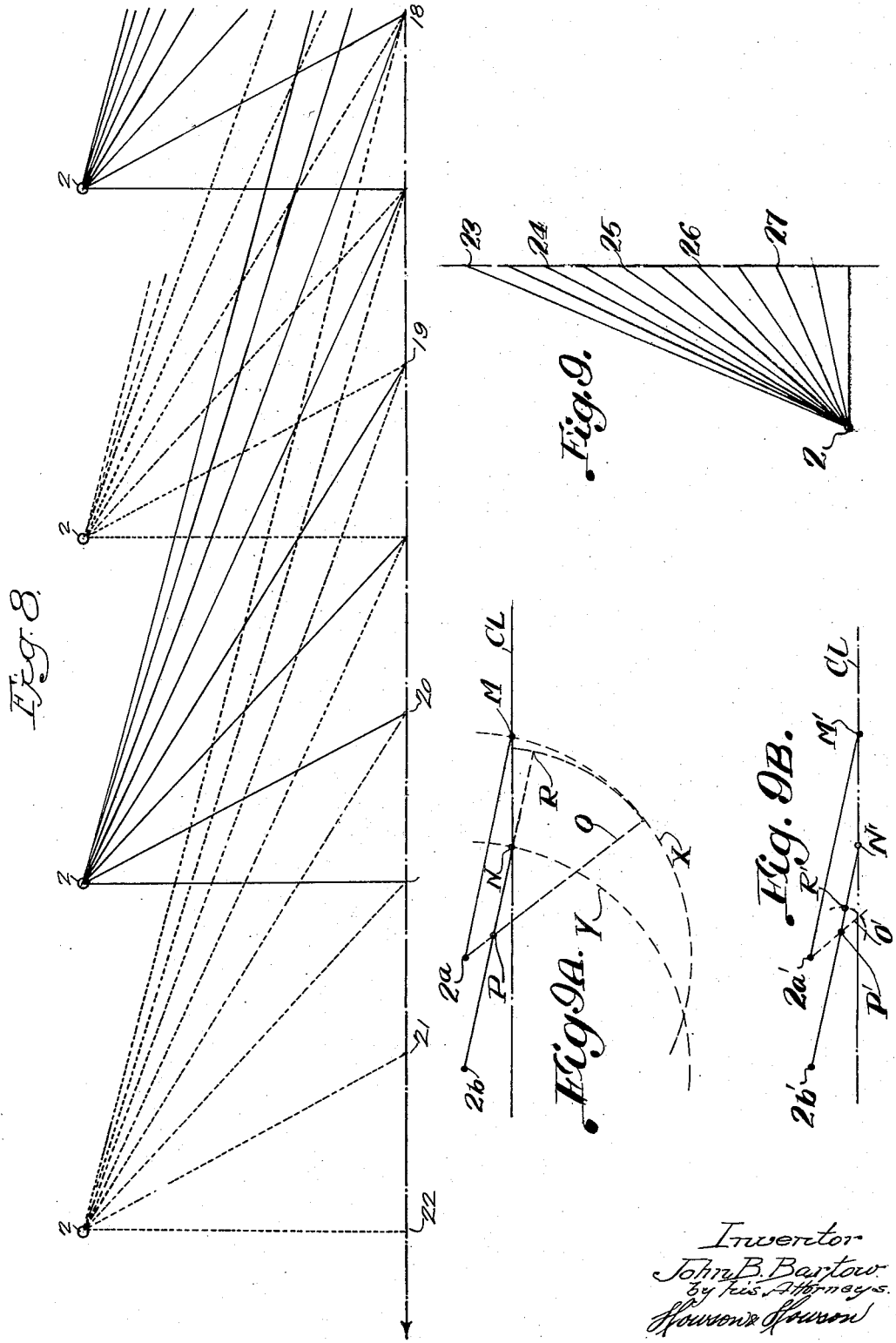

April 18, 1939.   J. B. BARTOW   2,155,295
AIRPORT LIGHTING SYSTEM
Filed March 21, 1935   6 Sheets-Sheet 5
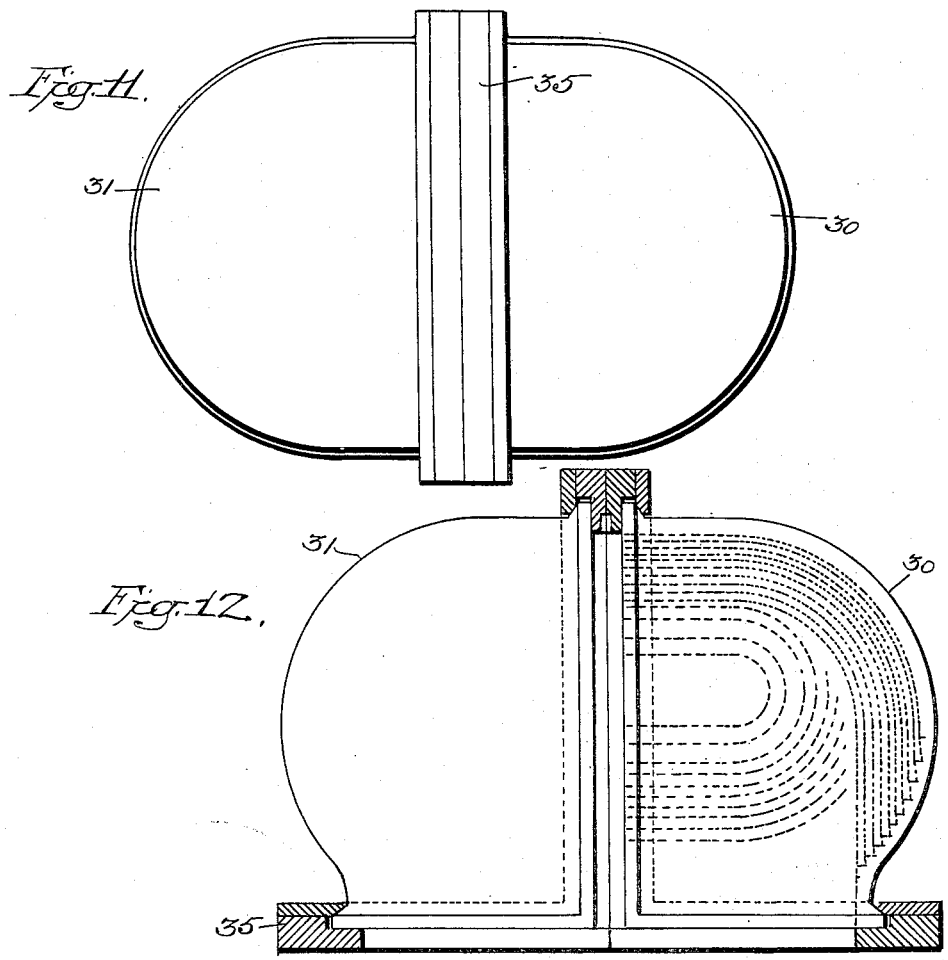
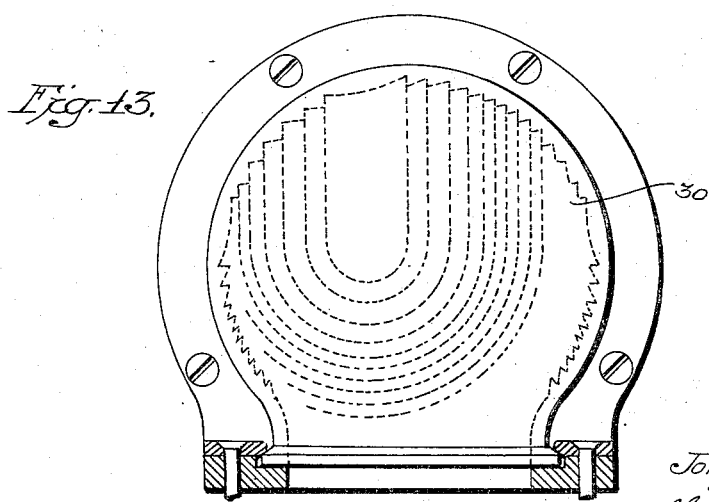

April 18, 1939.  J. B. BARTOW  2,155,295
AIRPORT LIGHTING SYSTEM
Filed March 21, 1935   6 Sheets-Sheet 6
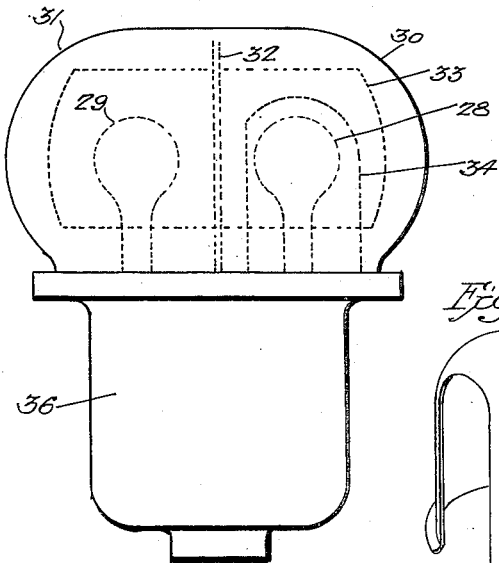
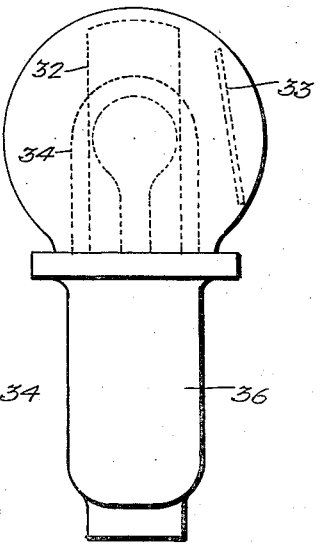
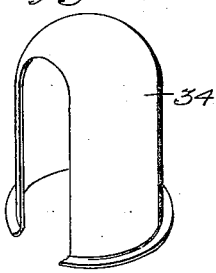
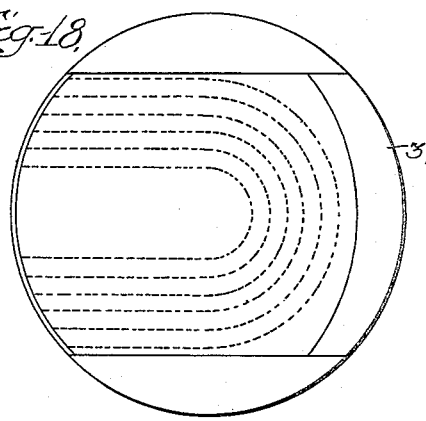
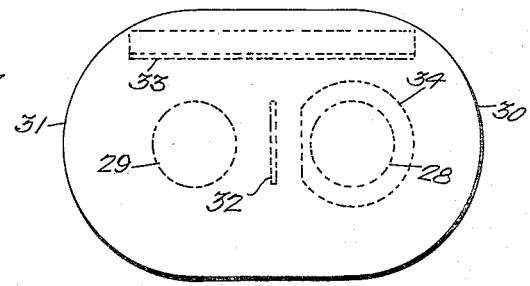
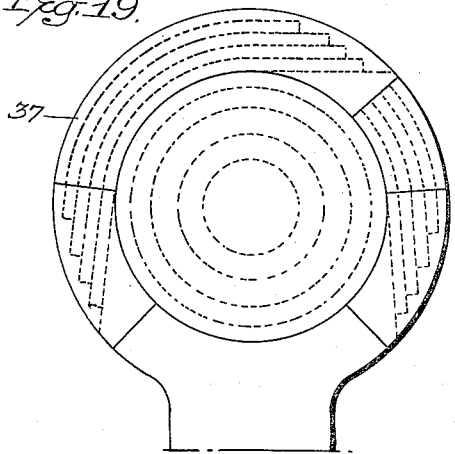
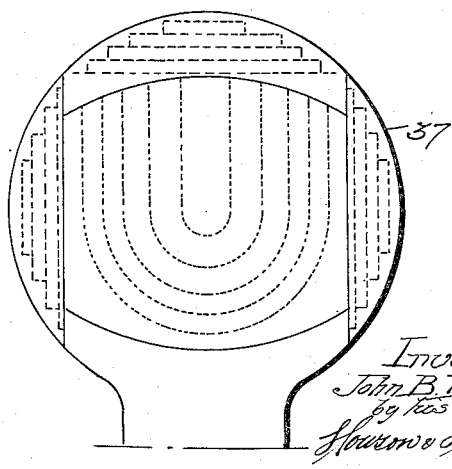
Inventor
John B. Bartow
by his Attorneys
Howson & Howson Patented Apr. 18, 1939

2,155,295

UNITED STATES PATENT OFFICE 2,155,295

AIRPORT LIGHTING SYSTEM

John B. Bartow, Blue Bell, Pa., assignor to Bartow Beacons Inc., Philadelphia, Pa., a corporation of Pennsylvania Application March 21, 1935, Serial No. 12,281

18 Claims. (Cl. 240—1.2)

This invention relates to air-port lighting systems and, more particularly, to landing and take-off systems for aircraft, the principal object being to provide an improved system of this nature which will enable an aircraft pilot to land or take off safely under extremely hazardous conditions, such as heavy mist or fog, during heavy storms, etc.

Heretofore, it has been the practice in the landing of aircraft to rely mainly upon a directional radio beam sent out from the air-port and which is picked up by an aircraft pilot, thus enabling him to direct his course of flight in the direction of the radio beam toward the air-port. This practice is generally satisfactory insofar as concerns the guiding of the pilot to the air-port but is practically of no value in assisting the pilot to land safely. At a result, it has been necessary for the pilot upon arriving in the immediate vicinity of the air-port to make what is commonly known as a "blind landing" when he is unable to actually see the air-port owing to heavy fog or other adverse weather conditions.

In making such a landing, the pilot is unable to determine with any degree of accuracy his position or elevation at any time during the landing of the aircraft and the making of a safe landing under such conditions is more or less a matter of chance. It has been quite a common occurrence in the past for a landing aircraft to crash right at the air-port because the pilot was unable to determine his elevation during landing and was, therefore, unable to bring the aircraft to the ground properly.

Lighting systems have heretofore been proposed and used to facilitate landing of aircraft at night and under adverse weather conditions, but such systems have failed in their purpose under extremely hazardous conditions such as heavy fog, snow storms and the like. By the present invention, there is provided a system, which is adapted particularly for the safe landing of aircraft under conditions of low or poor visibility, comprising a runway and a lighting system associated therewith designed to guide the pilot of an aircraft during landing and to apprise him of his position and elevation at any particular time, thus avoiding the necessity of blind landing. Where, in the following specification and claims, I use the term "runway", it is to be understood that I refer broadly to that area or space which is devoted to landing and taking off of aircraft, including the "approach" and "leaving" areas at the end portions of the "ground" area. The system embodies certain novel features which are described in detail hereinafter and set forth in the claims. For a clear understanding of the invention, reference may be had to the accompanying drawings illustrating a specific embodiment, it being understood, however, that the invention is not limited thereto.

In the drawings:

Figs. 1 and 2 are diagrammatic plan views of the system showing the color light scheme;

Fig. 3 is a similar view showing the horizontal distribution of light from the light projectors;

Fig. 4 is a diagrammatic side elevational view of the system, showing the vertical distribution of light from the light projectors;

Fig. 5 is an enlarged fragmentary view similar to Fig. 4 illustrating in detail the landing of an aircraft;

Fig. 6 is a plan view corresponding to Fig. 5;

Fig. 7 is an elevational view along line 7—7 of Fig. 5;

Figs. 8 and 9 are enlarged diagrammatic views illustrating an important feature of the invention;

Figs. 9A and 9B are explanatory diagrams illustrating more clearly the features shown in Figs. 8 and 9;

Fig. 10 is a perspective view of a reflector which is preferably used;

Fig. 11 is a plan view of one of the dual unit light projectors;

Fig. 12 is a side elevational view of the same;

Fig. 13 is an end elevational view of the same device;

Figs. 14, 15, and 16 are diagrammatic views of the same device;

Fig. 17 is a perspective view of a color screen;

Fig. 18 is a plan view of a single unit projector;

Figs. 19 and 20 are elevational views of the same; and

Fig. 21 is a diagrammatic illustration of electrical circuits of the system.

Referring to Figs. 1 and 2, the system comprises a runway 1 which is defined by rows of light projectors 2 on each side of the runway. These projectors are especially designed and adapted to function cooperatively in a manner which will be presently described. The light projectors may be mounted in any desired fashion. There are also preferably provided rows of reflecting devices 4 which run longitudinally of the runway and which may consist of glass prisms or the like laid in rows so as to form illuminated guide lines running the length of the runway. These glass prisms may be in the form of bricks and may be imbedded in the surface of the runway, as will be described hereinafter.

In accordance with the present invention, the light projectors are adapted to have certain light distribution characteristics as will now be explained with specific reference to Figs. 3 to 9. In the system illustrated, the proper direction of landing or take-off is from right to left. It is well known that it is impossible to pierce heavy fog, snow storms, and other conditions of low atmospheric light transmission with light to any great extent and this has been the reason for failure of prior lighting systems. By providing a certain light distribution and a certain arrangement of light beams, I am able to make use of the limited fog penetration of light in the guidance of aircraft pilots. Figs. 3 and 6 illustrate the distribution from the light projectors in a horizontal plane and it will be seen that the light beams from the various projectors overlap one another. For clarity of illustration, only some of the light beams are illustrated. As seen more clearly in Fig. 6, the side projectors are adapted to concentrate their light beams inwardly over the runway. For the sake of clarity, the light distribution lines are of different types. The side projectors are arranged in pairs transversely of the runway and if any one of the pairs be considered in Fig. 6, it will be seen that the beams of the two opposed light projectors extend inwardly over a major portion of the width of the runway in overlapping relation. As a result, there is formed along the runway a central lane defined by the overlapping portions of the light beams. As a result, a pilot flying his aircraft along or through this central lane will be within the light range of the light projectors on each side of the runway.

The vertical light distribution of the light projectors is shown in Figs. 4, 5 and 7. It will be seen that the vertical light distribution from each of the side projectors is in the general form of a quadrantal area facing in the direction of proper approach of a landing aircraft, and having a boundary line 5 which is generally perpendicular to the ground and a boundary line 6 which is generally parallel to the ground. Thus, the space pierced by the beam from each light projector is relatively narrow in width and quadrantal vertically. In a horizontal plane, the beam from each light projector is oblong in shape with the beams of the opposed side projectors converging inwardly in overlapping relation. It is important to note also that the beams of the various projectors overlap in a vertical plane as shown in Figs. 4 and 5.

In Figs. 5 and 6 there is depicted the landing of an aircraft during the existence of a dense fog, snow storm or other condition of low atmospheric transmission of light, the aircraft being shown in successive positions during landing. The candle power intensity of the light projectors 2 has been so regulated that the lights 2 are visible to the pilot from a distance of say 500 feet, this candle power intensity being regulated and controlled in accordance with existing atmospheric conditions, preferably by means hereinafter described. As he enters the overlapping light ranges of these projectors, the pilot sees these light sources as a guide line. In the position A, the aircraft has just entered the central lane above mentioned and has just come within the range of the side projectors. In this position, the aircraft is within the range of the light projectors 2a and 2b whose light distribution curves are designated, respectively, 7 and 8. At this time, therefore, the pilot will be able to see the two light sources 2a and 2b on each side of the runway and these light sources will serve to initially establish parallel guide lines between which the pilot may direct his course of flight. In this position, the other runway lights in advance of the lights 2a and 2b are not visible from the aircraft, due to the inability of such lights to penetrate the distance of low atmospheric light transmission between the aircraft and such lights, it being recalled that the lights 2 have been regulated so as to be visible for a distance of say 500 feet under existing atmospheric conditions. When the aircraft reaches the position B, it will be closer to the ground and to the lights 2 and will be within the range of four light projectors on each side of the runway, viz., projectors 2b, 2c, 2d, and 2e, the light distribution curves of the latter three being designated, respectively 9, 10, and 11. At this time, the pilot will be able to see four light sources on each side of the runway in advance of the aircraft, so that there will be established parallel guide lines of greater length than before. When the aircraft has reached the position C, it will be closer to the ground and to the lights 2 and will be within the range of six light projectors on each side of the runway, viz., projectors 2c, 2d, 2e, 2f, 2g, and 2h, the light distribution curves of the latter three being designated, respectively, 12, 13, and 14. At this time, therefore, the pilot will be able to see six light sources on each side of the runway in advance of the aircraft, and parallel guide lines of still greater length will, therefore, be established. When the aircraft has reached the position D still closer to the ground and to the lights 2, it will be within the light range of eight projectors on each side of the runway, viz., 2d, 2e, 2f, 2g, 2h, 2i, 2j, and 2k, the light distribution curves of the latter three being designated, respectively, 15, 16, and 17. At this time, the pilot will be able to see eight light sources on each side of the runway in advance of the aircraft which establish parallel guide lines of still greater length. Thus, during the landing flight of the aircraft, there are provided for the pilot's guidance parallel guide lines which increase in length as the aircraft approaches the ground. The pilot's perspective view of the light sources gives him a sense of elevation and he is enabled to tell when he is near the ground. Thus, while it is impossible to illuminate the landing or take-off space, when it is permeated with dense fog or other conditions of low atmospheric light transmission, so as to provide clear visibility for the pilot, it is possible by this invention to guide him and give him a sense of elevation by the visibility of light sources arranged as described.

It will be seen that the desired result above described is obtained by the specific light distribution and overlapping arrangement of the light beams. In any particular instance, the spacing of the light projectors may be chosen in relation to the light intensity, or vice versa, to obtain the desired result. In a specific example, the runway may be 200 feet wide and the side light projectors 2 may be spaced 100 feet apart along the runway. The lamps of the projectors may be 100 watt lamps. In a very dense fog or similar condition, the range of visibility of the side projectors, in this instance, will be about 500 feet.

A very important feature of the invention is that the light distribution and arrangement of the light beams gives substantially uniform light intensity over the path of the aircraft and the light sources are visible to the pilot with equal intensity. Referring to Fig. 8, there is shown on enlarged scale the horizontal light projection and distribution from several of the side projectors. The broken line arrow indicates the path of the aircraft. Since the path of travel is at an angle to the light beam from each of the projectors, the variation in distance from the aircraft to the light source substantially balances the variation in beam candle power giving substantially uniform intensity along the path of travel. Thus in Fig. 8, the candle power of that portion of the beam of the extreme left-hand source projected to point 18 is high but the distance from the light source to that point is relatively great. The portions of the same beam projected to points 19, 20, 21, and 22, are of lesser and decreasing candle power but the distances from the light source to these points get progressively shorter. The result is that the light intensity at points 18 to 22 is substantially uniform. This eliminates any glaring or blinding effect which would be caused by variation in light intensity along the path of travel.

It should be noted also that the beams of adjacent side projectors cross one another. The high candle power portion of each beam projects into the low candle power portions of the immediately preceding beams. The projectors 2 are arranged to project their high intensity beams parallel to each other and at an angle to a vertical plane passing through the row of light projectors, and their beams of lesser or diminishing intensity parallel to each other and at an angle to the beams of high intensity. The projectors 2 of each row are spaced so that the beams of high intensity from one projector overlap the beams of diminishing intensity from adjacent projectors, thus establishing a vertical plane of uniform light intensity along the runway parallel to the vertical plane passing through the row of light projectors. This arrangement will be readily apparent from an examination of Fig. 8, and the specific and preferred construction of projectors and lenses by means of which this distribution is effected will be fully described hereinafter. By this arrangement, the projector of the beam of high intensity is visible to a pilot of an aircraft within the last mentioned vertical plane, notwithstanding the projected light of the low candle power portion of the beam of the preceding projector arranged along the runway. Due to the fact that the high candle power portion of a beam is stronger than the light from the low candle power portions of the preceding beams reflected by the mist or fog, the source of the first-mentioned beam is clearly visible to the approaching pilot. It should be noted that if the reflected light were stronger than the direct light, the source of the direct light could not be clearly seen. Thus, the pilot is enabled to see all of the light sources within his range of vision and the light sources are visible to him with equal intensity as he proceeds.

Uniform intensity is also obtained vertically in the path of the aircraft, as may be seen in Fig. 9, wherein there is shown on enlarged scale the vertical light projection and distribution of one of the side projectors. The vertical line indicates the plane of travel and it will be seen from the above discussion that the light intensity at points 23, 24, 25, 26, and 27 is substantially uniform. Thus, regardless of the elevation of the aircraft, the light intensity remains the same, thereby eliminating glare or blinding effect due to uneven intensity.

It will be seen from Figs. 8 and 9 that there is established a vertical plane in the path of the aircraft at any point of which plane a plurality of light sources will be visible to the pilot with even intensity, and that the light intensity along the said plane will be uniform, thereby eliminating any high lights which would prevent the pilot from seeing the lower intensity lights due to the physical character and functioning of the human eye.

The manner in which the successive light sources are made visible to the pilot with even intensity and without glare may be more fully understood by reference to Figs. 9A and 9B wherein two consecutive light sources are shown. If the light from these sources were not distributed according to the invention, the conditions illustrated in Fig. 9A would obtain. Each of the sources 2a and 2b would have equal distribution of light at all angles about the source. In Fig. 9A, the circular lines X and Y represent, respectively, the practical thresholds of visibility of the two sources 2a and 2b. The center line of the runway is represented by the line CL.

Under such circumstances, a pilot proceeding along line CL in the direction indicated and arriving at point M (the intersection of X and CL), would see the source 2a but not the source 2b. As he continued along line CL, the light from 2a would become increasingly brighter and the iris of the eye would adjust itself accordingly. Arriving at point N (the intersection of Y and CL and on the threshold of visibility of source 2b), the pilot would be unable to see source 2b due to the iris of his eye having been stopped down by the brighter light from source 2a and due also to the interference or veiling glare of 2a. To explain the latter, reference is made to the line O of projected light from source 2a, such line being chosen merely for illustration. Such light may be reflected off the fog or atmosphere at point P, for example, toward point N, and assuming 100% reflection for the sake of illustration only, the reflected light would reach point R. Obviously, at point N, the light from source 2a reflected off the fog at P is brighter than the light from 2b, it being remembered that N is on the threshold of visibility of 2b.

Now when the light from these same sources is distributed according to the invention, as illustrated in Fig. 8 and previously described, the above objections are eliminated. This may be seen from Fig. 9B wherein the sources 2a' and 2b' have their practical threshold of visibility substantially coincident with the line CL. In this instance, when the pilot reaches point M', source 2a' is visible with threshold intensity. As he continues toward point N' the brightness of source 2a' remains constant and the iris of the eye is maintained at its maximum opening and is not stopped down. Upon reaching point N', the pilot sees sources 2a' and 2b' with equal brightness and there is no veiling glare as in the case of Fig. 9A.

Assuming 100% reflection, as above, the light from 2a' along line O' may be reflected off the fog or atmosphere at point P' toward point N'. But in this case, the reflected light will reach only to point R' and will not be visible from N'. Hence the pilot is able to see source 2b' just as clearly as source 2a'. Thus, due to correct distribution, the interference or veiling glare of 2a' is eliminated.

By virtue of the correct distribution according to the invention, it is possible to increase the candle power of the light sources, which is not feasible in the case of Fig. 9A for it would only aggravate the conditions above described.

In further accordance with the invention, the various light projectors may be distinctively characterized to apprise the pilot of a landing aircraft of the correct direction of landing and to assist him in the landing process by apprising him of his position longitudinally of the runway, thereby avoiding the possibility of his overrunning the runway with the possible consequences. Specifically, it is proposed to apply colors in a particular color scheme to the lighting system but the light projectors may be distinctively characterized in any other suiable manner such as by the use of different types of projectors or lamps or differently shaped light-projecting devices.

Assuming, for example, that the system shown in Figs. 1 and 2 is adapted for correct landing in the direction of the arrow shown in Fig. 1, then the reverse arrow of Fig. 2 indicates the incorrect landing direction. With the device thus adapted, the light projectors arranged along the approach at each end of the runway may be adapted to project in the direction of approach of a landing aircraft, light of a certain distinctive color, such as green, as indicated in Fig. 1. The light projectors immediately following may be adapted to project in the direction of approach of a landing aircraft, light of a distinctively different color and it is preferred that the light from these projectors shall be clear or white, as indicated in Fig. 1. Immediately following the zone of clear light projectors, there may be established another distinctive zone by having certain of the light projectors adapted to project in the direction of a landing aircraft, light of a distinctively different color, such as yellow or amber as indicated in Fig. 1. Following this, there may be a zone of distinctively different color, such as red, as indicated. It will be understood, of course, that the relative lengths of these various zones may be varied and the colors employed may likewise be varied. The specific color scheme herein suggested seems appropriate because the green lights along the approach to the runway will indicate to the pilot that his direction of approach is correct and as he enters and traverses the area above the runway, the clear and amber lights will indicate his approximate position along the runway. When he reaches the amber lights, he should be on the ground or about to land. As he encounters the red zone, the pilot is apprised of the fact that he is nearing the end of the runway and should be on the ground and if he is not, he should continue in flight and make another approach.

Thus, the different colors of the light beams will enable the pilot to tell his position longitudinally of the runway. He is, therefore, able to tell whether it is safe to ground the aircraft when the sense of elevation, derived as above explained, indicates to him that the aircraft is near the ground. In the event that a landing would be unsafe, the pilot may redirect his flight into the air and he may then circle around and repeat the landing process.

In this specific adaptation of the system for landing in the direction indicated in Fig. 1, the light projectors will be adapted to indicate the improper direction of landing if the pilot should approach the runway from the wrong direction. Any distinctive characterization of the lighting projectors or the light therefrom may be employed but, consistent with the color scheme above mentioned, it is preferred to adapt the light projectors so that they all give off red light in the direction of improper approach of an aircraft, as indicated in Fig. 2. Therefore, a pilot approaching the runway in the wrong direction will be fully apprised of this by reason of all of the lights being red. Initially, he will come within the light range of the end projectors, and seeing that they are red, he will at once know that his direction of approach is improper, but should he continue into the runway by accident, he will see that all of the lights as he comes within their respective ranges are red and he will, therefore, continue in flight and circle around so as to approach the runway in the proper direction. The projectors may also give off red light to the outer side, as illustrated, and as to be hereinafter more fully described.

The combined features of the invention above described give to the pilot the two things which are necessary to avoid blind landing, viz., sense of elevation and sense of horizontal position. Moreover, by providing parallel guide lines, the system greatly facilitates the landing of aircraft because it is a relatively easy matter for the pilot to direct his course between such guide lines. It should be noted, however, that a single row of projectors arranged along the runway as above described could be used to give a single guide line and while this is less desirable, it is within the scope of the invention. The method of landing aircraft which this invention provides eliminates the necessity of relying upon the directional radio beam which, as above mentioned, is an inadequate guide in landing, and the invention overcomes the serious drawbacks or objections of prior lighting systems.

The above discussion has been with particular reference to landing of the aircraft because that is most hazardous in a heavy fog or like condition. However, the system also facilitates take-off during which the pilot proceeds along the runway in the same direction and is apprised of his position therealong and of his elevation, as above described, the process being just the reverse of landing.

The reflecting devices which may be laid longitudinally of the runway so as to provide guide lines, as above mentioned, may take the form of brick-shaped glass prisms, such as illustrated in Fig. 10, embedded in the runway with their reflecting prismatic surfaces downward. These devices serve to refine the system in that they provide guide lines within the guide lines above mentioned, thus serving to better direct the pilot in his landing flight. The rows of reflecting devices receive light from the light projectors and reflect it upwardly. Guide lines of reflected light are, therefore, visible to the pilot when he comes within the light range of the projectors. These guide lines of reflected light will increase in length as the aircraft approaches the ground, as will be obvious from the above discussion relative to the illustration of Figs. 5 and 6. It will be understood that as many parallel rows of the reflecting devices may be used as may be desired in any particular instance.

The side projectors preferably take the form of dual units, as illustrated in Figs. 11 to 16. The purpose of this is to adapt the system for change of the direction of landing or take-off of the aircraft. Only one of the lamps of each of these units will be operated at any particular time, the particular lamp being operated depending upon the desired direction of landing or take-off of the aircraft. As shown in Figs. 14 and 16, each unit comprises lamps 28 and 29. The lens structures 30 and 31, associated respectively with the two lamps are similar in design and each is adapted to effect distribution of the light from its associated lamp in the manner above described, the only difference being that the concentration of light or direction of the light beam from one of the lamps is opposite to that of the other.

Between the lamps of each unit, there is provided a stationary color screen 32 and at one side of the lamps, there is provided a second stationary color screen 33. The purpose of these color screens is to give light of a certain color, such as red, in the direction of improper landing and also toward the outside of the runway, as described above. A removable color screen 34 (see Fig. 17) is placed over the lamp which it is desired to use at any particular time. In the illustration of Figs. 14 to 16, the right-hand lamp 28 has the color screen 34 placed thereover and the light emanating from this lamp in the direction of approach of the aircraft will, therefore, be given the desired color and will be distributed in the manner above explained by virtue of the lens structure 30. The left-hand lamp 29 being inoperative, light from lamp 28 may pass through the left-hand portion of the unit but will be given the desired red color by the color screen 32. Thus, the direction of improper approach of the aircraft will be indicated as above explained. The projection of red light by means of the stationary color screen 33, is effective to establish a line of red light projecting outwardly from the side of each row of light projectors along the two sides of the runway, this red light being visible to the pilot of an aircraft only when he is to the right or to the left of the runway, it being obvious that when the pilot is to the right of the runway, the row of red lights on his left side, i. e., the row of lights along the right side of the runway, will be visible to him, thus indicating to the pilot that he is not over the runway but is to the right thereof. If the pilot is to the left of the runway, the row of red lights on his right side, i. e., the row of lights along the left side of the runway, will be visible to him, thus indicating to the pilot that he is to the left of the runway. Further, the projection of red light to the outer side of the runway by means of the stationary color screen 33, will perform an important function in the event that one row of light projectors 2 should, for any reason, be rendered inoperative, i. e., if only a single row of lights remained illuminated. In this event, the existence of the outwardly projected red light which obviously appears only along the outer side of the runway, will definitely inform the pilot as to the actual location of the runway with respect to the said row of lights. For example, if the pilot is landing in the direction of the arrow in Fig. 1, and the row of lights along the left side of the runway should be extinguished, the pilot would know that the actual runway is located on the left side of the row of lights along the right side of the runway, i. e., the outwardly-projected red light visible along the right side of the remaining row of lights along the right side of the runway would inform the pilot that he could not safely land to the right side of said remaining row of lights. Further, the projection of red light to the outer side of the runway is of considerable importance in landing fields in which a plurality of runways are arranged in spaced, parallel relation, as the projected red light will effectively prevent the pilot from landing on the unimproved area between the separate runways, i. e., the pilot knows that this red light projects outwardly from the lights arranged along the two opposite sides of each runway, and he would, therefore, not attempt to land on a portion of the field located between rows of inwardly projected red light.

The structure of each of these units may be as shown in Figs. 11 to 13, and may comprise a lens-supporting frame 35 adapted to seat on a base 36 (see Figs. 14 and 15). With the present day knowledge of the design of light projectors, it is a relatively simple matter to provide lens structures which will give the desired light distribution. Such lens structures may be comprised of prismatic or bulls-eye lens sections as illustrated in Figs. 11 to 13.

If desired, the projectors may take the form illustrated in Figs. 18 to 20, each of these units comprising a single lamp having the lens structure 37 thereabout which is adapted to give the projected light the desired distribution as above described. Here also, the lens structure is a relatively simple matter of design, being composed of prismatic or bulls-eye lens sections as illustrated. In this instance, the lens sections are preferably of the colors to give the desired color of the light as above described, thus eliminating the necessity of using separate color screens.

The system is preferably arranged as illustrated in Fig. 21. It will be seen that each of the side light projectors comprises a dual unit, as above described, with the individual lamps of the unit arranged longitudinally of the runway. To complete the adaptation of the system for reversal of the direction of landing, the electrical connections may be as illustrated. The electrical input terminals are shown at 38 and 39 and may be connected to any suitable source of electrical energy (not shown). The terminal 38 may be connected through a rheostat 40 to parallel circuits 41 and 42, which include parallel branch circuits 43 and 44, and 45 and 46, respectively. The branch circuits 43 and 44 include corresponding lamps of the side projector units. The branch circuits 45 and 46 are similar but include the other lamps of the various projectors. The circuits 41 and 42 are connected respectively to selectable contacts 47 and 48 of the switch 49. The movable contact arm 50 of the switch is connected to the input terminal 39 and is adapted for movement between the switch contacts 47 and 48.

It will be seen that either of the parallel circuits 41 and 42 may be energized by proper actuation of the switch. In one position of the switch, the projectors or lamps will be energized, whose light distribution is in a certain direction, adapting the system for landing approach of aircraft from that direction. In the other position of the switch, the lamps or projectors will be energized, whose light distribution is in the opposite direction, adapting the system for landing of aircraft from that direction. This makes the system flexible and widens its possibilities of use. The rheostat 40 enables adjustment of the intensity of the lights. Thus, in clear weather, the system may be used but the light intensity may be lowered, thereby saving the cost of unnecessary current consumption.

The ability to regulate or control the candle power intensity of the lights 2 is highly important, this candle power intensity being determined in accordance with existing atmospheric conditions, i. e., when atmospheric transmission of light is high, the lights are regulated so as to be of relatively low candle power intensity, and, conversely, when the atmospheric transmission of light is low, due to dense fogs, snow storms or the like, the lights are regulated so as to be of relatively high candle power intensity. Thus, the brightness of the lights to the pilot of the aircraft is maintained uniform and there is no possibility of the lights blinding the pilot during the landing and take-off operations. Obviously, if weather conditions are clear, the candle power intensity of the lights is maintained at a minimum and, due to the high atmospheric transmission of light, the lights are all visible to the pilot.

From the above description, it will be seen that I have provided a novel and useful system which fulfills an urgent need, particularly in view of the increasing trend toward air travel during both day and night. Although the invention has been disclosed with specific reference to a preferred form, it will be understood that it is capable of modification or change so long as the essential principles herein set forth are maintained.

I claim:

1. A landing and take-off system for aircraft, comprising a runway, a row of spaced light projectors on each side of said runway and defining the same and means for varying the candle power intensity of the light projectors in accordance with existing conditions of atmospheric light transmission, said projectors being adapted to concentrate light over a generally vertical quadrantal area only, facing in the direction of approach of a landing or taking-off aircraft.

2. A landing and take-off system for aircraft, comprising a runway, a row of spaced light projectors on each side of said runway and defining the same and means for varying the candle power intensity of the light projectors in accordance with existing conditions of atmospheric light transmission, each of said projectors being adapted to project a light beam concentrated in the direction of approach of a landing or taking-off aircraft, the light beams from said projectors overlapping in such manner that at every instant during landing, an aircraft pilot is within the beams of a plurality of projectors on each side of the runway, whereby a guide line is established continuously on each side of the runway, said light beams being distinctively colored to indicate to the pilot different positions along the runway.

3. A landing and take-off system for aircraft, comprising a runway, one or more rows of light-reflecting devices laid longitudinally along said runway, and a row of spaced light projectors on each side of said runway and defining the same, each of said projectors being adapted to project a light beam inwardly of said runway onto the light reflecting devices thereon and concentrated in the direction of approach of a landing or taking-off aircraft, the light beams from said projectors overlapping in such manner that at every instant during landing, an aircraft pilot is within the beams of a plurality of projectors on each side of the runway, whereby a guide line is established continuously on each side of the runway and the light reflecting devices on the runway are rendered visible to the aircraft pilot.

4. In a landing and take-off system for aircraft, a runway, and a row of spaced light projectors along a side of said runway, said light projectors having means to project light beams of high and diminishing intensity, said projectors being arranged to project their high intensity light beams parallel to each other and at an angle to a vertical plane passing through the row of light projectors, and their beams of diminishing intensity parallel to each other and at an angle to the beams of high intensity, said projectors being spaced so that the beams of high intensity from one projector overlap the beams of diminishing intensity from adjacent projectors, thus establishing a vertical plane of uniform light intensity along the runway parallel to the vertical plane passing through the row of light projectors, a plurality of said light projectors being visible to the pilot of the aircraft with equal intensity from any point in said vertical plane of uniform light intensity.

5. In a landing and take-off system for aircraft, a runway, and a row of spaced light projectors along a side of said runway, said projectors having lenses which project beams of high and diminishing intensity, and said projectors and lenses positioned to project the high intensity beams parallel to each other and at an angle to a vertical plane passing through the row of light projectors and the beams of diminishing intensity parallel to each other and at an angle to the beams of high intensity, said projectors being spaced so that the beams of high intensity from one projector overlap the beams of diminishing intensity from adjacent projectors, thus establishing a vertical plane of uniform light intensity along the runway in a plane parallel to the vertical plane passing through the row of light projectors, whereby the projector of the beam of high intensity is visible to the pilot of the aircraft within the vertical plane of uniform light intensity notwithstanding the reflected light of the beam of diminishing intensity from the preceding projector arranged along the runway, thus rendering the light projectors visible to the pilot of the aircraft with equal intensity from any point in said vertical plane of uniform light intensity.

6. In a landing and take-off system for aircraft, a runway, and a row of spaced light projectors along a side of said runway, said projectors having lenses which project overlapping light beams toward the direction of approach of a landing or taking-off aircraft, each projector projecting beam portions of different intensity parallel to the beams of substantially equal intensity from the other projectors of the row, the beams of different intensity from the projectors being projected at different respective angles to a predetermined vertical plane along said runway such that the light intensities of said beam portions at any point in said plane are substantially uniform.

7. A landing and taking-off system for aircraft, comprising a runway, and a row of spaced light projectors positioned along one side of said runway, said light projectors comprising a lamp unit for projecting a beam of light toward that end of the runway where landing or taking-off is proper and a beam of light toward the outer side of said runway, said first-mentioned beam of light indicating to the pilot of an approaching aircraft, the proper direction of approach, and said second-mentioned beam of light being of a color distinct from that of the first mentioned beam of light to inform the said pilot whether the aircraft is or is not in proper position for landing by indicating to the pilot the position of said runway with respect to the row of spaced light projectors.

8. A landing and take-off system for aircraft, comprising a runway, and a row of spaced light projectors positioned along one side of said runway, said light projectors comprising a lamp unit for projecting beams of light toward opposite ends of said runway and a beam of light toward the outer side of said runway, the beam of light projected toward one end of said runway being distinctively colored with respect to the beam of light projected toward the opposite end of said runway, to indicate to the pilot of an approaching aircraft, the proper and improper direction of approach for landing or taking-off, and the beam of light projected toward the outer side of said runway informing the pilot of an approaching aircraft whether the aircraft is or is not in proper position for landing by indicating to the pilot the position of said runway with respect to the row of spaced light projectors.

9. A landing and take-off system for aircraft comprising a runway; and a row of spaced light projectors positioned along one side of said runway, each of said projectors comprising a casing containing two spaced lamps, means for projecting the beams of light from either of said lamps toward opposite ends of said runway, means for selectively illuminating one or the other of said lamps, and a color screen positioned between said lamps, whereby the beam of light projected from either of said lamps toward one end of the runway will have a distinctive color with respect to the beam of light projected toward the opposite end of said runway to indicate to the pilot of an approaching aircraft the proper and improper direction of approach for landing or taking-off.

10. A landing and take-off system for aircraft comprising a runway; and a row of spaced light projectors positioned along one side of said runway, each of said projectors comprising a casing containing two spaced lamps, means for projecting the beams of light from either of said lamps toward opposite ends of said runway, means for selectively illuminating one or the other of said lamps, a color screen positioned between said lamps whereby the beam of light projected from the illuminated lamp toward one end of the runway will be of a color corresponding to that of the color screen, and a second color screen associated with the illuminated lamp and of a color distinct from that of the first mentioned color screen, whereby the beam of light projected from the illuminated lamp toward the opposite end of the runway will be of a color corresponding to that of the second color screen to indicate to the pilot of an approaching aircraft the proper and improper direction of approach for landing and taking-off.

11. A landing and take-off system for aircraft comprising a runway; and a row of spaced light projectors positioned along one side of said runway, each of said projectors comprising a casing containing two spaced lamps, means for projecting beams of light from either of said lamps toward opposite ends of said runway and toward the outer side of said runway, means for selectively illuminating one or the other of said lamps, a color screen positioned between said lamps whereby the beam of light projected from either of said lamps toward one end of the runway will have a distinctive color with respect to the beam of light projected toward the opposite end of said runway to indicate to the pilot of an approaching aircraft the proper and improper direction of approach for landing or taking-off, and a second color screen associated with said lamps whereby illumination of either of said lamps will cause the beam of light projected toward the outer side of said runway to be of a color corresponding to that of said second color screen whereby the beam of light projected toward the outer side of said runway will inform the pilot whether the aircraft is or is not in a proper position for landing by indicating to the pilot the position of said runway with respect to the row of spaced light projectors.

12. A landing and take-off system for aircraft comprising a runway; and a row of spaced light projectors positioned along one side of said runway, each of said projectors comprising a casing containing two spaced lamps, means for projecting beams of light from either of said lamps toward opposite ends of said runway and toward the outer side of said runway, means for selectively illuminating one or the other of said lamps, a color screen positioned between said lamps whereby the beam of light projected from the illuminated lamp toward one end of the runway will be of a color corresponding to that of the color screen, a second color screen associated with the illuminated lamp and of a color distinct from that of the first mentioned color screen, whereby the beam of light projected from the illuminated lamp toward the opposite end of the runway will be of a color corresponding to that of the second color screen to indicate to the pilot of an approaching aircraft the proper and improper direction of approach for landing and taking-off, and a third color screen associated with said lamps whereby illumination of either of said lamps will cause the beam of light projected toward the outer side of said runway to be of a color corresponding to that of said third color screen whereby the beam of light projected toward the outer side of said runway will inform the pilot whether the aircraft is or is not in a proper position for landing by indicating to the pilot the position of said runway with respect to the row of spaced light projectors.

13. In a landing and take-off system for aircraft, a runway, and a row of spaced light projectors along each side of said runway, the light projectors of each row having means for projecting light beams of high and diminishing intensity toward the direction of approach of a landing or taking-off aircraft, the beams of high intensity from each projector of the same row overlapping the beams of diminishing intensity from the other projectors of the same row, said high intensity beams from the projectors of each row being substantially parallel to like beams from the projectors of said row and at an angle to a vertical plane passing through the longitudinal center of said runway, and the beams of diminishing intensity from the projectors of each row being substantially parallel to like beams from the projectors of said row and extending at an angle to the beams of high intensity from the light projectors of the same row, whereby the apparent intensity of all of the light projectors is the same as viewed by the pilot of an approaching aircraft.

14. In a landing and take-off system for aircraft, a runway, and a row of spaced light projectors along each side of said runway, the light projectors of each row having means for projecting light beams of high intensity over a generally vertical quadrantal area above said runway and facing only in the direction of approach of a landing or taking-off aircraft, the beams of high intensity from each projector of the same row overlapping the beams of diminishing intensity from the other projectors of the same row, said high intensity beams from the projectors of each row being substantially parallel to like beams from the projectors of said row and extending at an angle to a vertical plane passing through the longitudinal center of the generally vertical quadrantal area above said runway, and the beams of diminishing intensity from the projectors of each row being substantially parallel to like beams from the projectors of said row and at an angle to the beams of high intensity from the light projectors of the same row, whereby a plurality of light projectors are visible with equal intensity to the pilot of an aircraft from any point in said generally vertical quadrantal area.

15. In a landing and take-off system for aircraft, a runway, a row of spaced light projectors along a side of said runway, and means for varying the candle power intensity of the light projectors in accordance with existing conditions of atmospheric light transmission, said projectors having means to project overlapping light beams toward the direction of approach of a landing or taking-off aircraft, each projector projecting beam portions of different intensity parallel to the beams of substantially equal intensity from the other projectors of the row, the beams of different intensity from the projectors being projected at different respective angles to a predetermined vertical plane along said runway such that the light intensities of said beam portions at any point in said plane are substantially uniform, the light beams from said projectors overlapping in such manner that at every instant during landing or take-off an aircraft pilot proceeding in said plane is within the beam range of a plurality of projectors, whereby a guide line of progressively varying length and of substantially uniform intensity is established continuously along the runway as the aircraft proceeds to descend toward or ascend from said runway.

16. A landing and take-off system for aircraft, comprising a runway, a row of spaced light projectors on each side of said runway and defining the same, and means for varying the candle power intensity of the light projectors in accordance with existing conditions of atmospheric light transmission, said projectors having means to project overlapping light beams toward the direction of approach of a landing or taking-off aircraft, each projector projecting beam portions of different intensity parallel to the beams of substantially equal intensity from the other projectors of the row, the beams of different intensity from the projectors being projected at different respective angles to a predetermined vertical plane along said runway such that the light intensities of said beam portions at any point in said plane are substantially uniform, the light beams from the projectors on each side of said runway overlapping in such manner that at every instant during landing or take-off an aircraft pilot proceeding in said plane is within the beams of a plurality of projectors on each side of the runway, whereby a guide line of progressively varying length and of substantially uniform intensity is established continuously on each side of the runway as the aircraft proceeds to descend toward or ascend from said runway.

17. A landing and take-off system for aircraft, comprising a runway, and a row of spaced light projectors on each side of said runway and defining the same, said projectors having means to project overlapping light beams toward the direction of approach of a landing or taking-off aircraft, and for projecting light beams toward the outer side of said runway, each projector having means to project beams of high and lesser intensity, said projectors being arranged to project their high intensity light beams parallel to each other and at an angle to a vertical plane passing through the row of light projectors, and their beams of lesser intensity parallel to each other and at an angle to the beams of high intensity, said projectors being spaced so that the beams of high intensity from one projector overlap the beams of lesser intensity from adjacent projectors, thus establishing a vertical plane of uniform light intensity along the runway parallel to the vertical plane passing through the row of light projectors, a plurality of said light projectors being visible to the pilot of the aircraft with equal intensity from any point in said vertical plane of uniform light intensity, the light beams from said projectors which are projected in the direction of approach of the landing or taking-off aircraft overlapping in such manner that at every instant during landing or take-off an aircraft pilot proceeding in said plane is within the beams of a plurality of projectors on each side of the runway, whereby a guide line of progressively varying length and of substantially uniform intensity is established continuously on each side of the runway as the aircraft proceeds to descend toward or to ascend from said runway, said light beams which are projected in the direction of approach of the landing or taking-off aircraft being distinctively characterized throughout the length of the runway to indicate to the pilot proper and improper direction of approach and different positions of proper approach along the runway, and said light beams which project toward the outer sides of the runway informing the pilot whether the aircraft is or is not in a proper position for landing by indicating to the pilot the position of the runway with respect to said rows of light projectors.

18. A landing and take-off system for aircraft, comprising a runway, and a row of spaced light projectors on each side of said runway and defining the same, said projectors having means to project overlapping light beams toward the direction of approach of a landing or taking-off aircraft, each projector projecting beam portions of different intensity parallel to the beams of substantially equal intensity from the other projectors of the row, the beams of different intensity from the projectors being projected at different respective angles to a predetermined vertical plane along said runway such that the light intensities of said beam portions at any point in said plane are substantially uniform, the light beams from said projectors overlapping in such manner that at every instant during landing or take-off an aircraft pilot proceeding in said plane is within the beams of a plurality of projectors on each side of the runway, whereby a guide line of progressively varying length and substantially uniform intensity is established continuously on each side of the runway as the aircraft proceeds to descend toward or ascend from said runway, each of said light projectors comprising a dual lamp unit having means for effecting alternate operation of the lamps to change the direction of light propagation and thereby adapt the system for landing of aircraft in either direction.

JOHN B. BARTOW.